United States Patent [19]

Ishizaka et al.

[11] 4,244,911

[45] Jan. 13, 1981

[54] MICA-SILICONE COMPOSITES

[75] Inventors: Mitsuo Ishizaka; Toshihiro Fujii, both of Ohta, Japan

[73] Assignee: Toshiba Silicone Co., Ltd., Tokyo, Japan

[21] Appl. No.: 970,034

[22] Filed: Dec. 15, 1978

[51] Int. Cl.² .............................................. B28B 7/10
[52] U.S. Cl. .............................. 264/331; 260/37 SB; 428/324; 428/447; 528/23; 528/25
[58] Field of Search ............... 260/37 SB; 528/23, 25; 264/331; 428/324, 447

[56] References Cited

U.S. PATENT DOCUMENTS

| 2,842,515 | 7/1958 | Agens | 528/23 |
| 3,525,707 | 8/1970 | Bobear | 528/23 |
| 4,085,250 | 4/1978 | Smith | 428/324 |

*Primary Examiner*—Melvyn I. Marquis
*Attorney, Agent, or Firm*—J. L. Young; E. P. Koltos; M. J. Doyle

[57] ABSTRACT

A silicone resin-mica composite comprising an organosiloxane resin, a mixture of acid phosphates and mica.

14 Claims, No Drawings

MICA-SILICONE COMPOSITES

BACKGROUND OF THE INVENTION

This invention concerns a polyorganosiloxane composition which is suitable for use in the manufacture of improved mica products and improved silicone mica products using the polyorganosiloxane composition. More specifically, the invention concerns mica products with superior mechanical strength, electrical characteristics, water resistance, and heat resistance, and also concerns a polyorganosiloxane composition used in the manufacture of mica products.

Mica, owing to its superior electrical characteristics and heat resistance, is widely used. Its mechanical strength, however, is poor and must be strengthened by molding or laminating with a binder for manufacturing mica products. The conventional binder is an inorganic polymer of a primary phosphate group or organic resin. One of the drawbacks of binders using inorganic polymer derived from condensed primary phosphate metal salt is a high manufacturing cost due to special facilities required for producing high temperatures of over 400° C. during the laminating process. Mica products thus obtained have superior heat resistance, but another drawback is inferior water resistance, which negatively affects mechanical strength and electrical characteristics in the presence of moisture. On the other hand, the advantages of using organic resins such as alkyd resin, polyester resin, epoxy resin or acrylic resin as binders are that lamination and molding can take place at a relatively low temperature of 100°-200° C. and the products have good mechanical characteristics. There are disadvantages, however, such as inferior water resistance compared to those using an inorganic polymer, as well as inferior heat resistance.

Conventionally, polyorganosiloxane resins with a heat resistance superior to organic resins are used as binders for mica products. Mica products using polyorganosiloxane resins exhibit superior heat resistance compared to those using organic resins, but are inferior in mechanical characteristics and their water resistance is not always satisfactory. To improve water resistance, the concurrent use of a polyorganosiloxane resin and a carbon functional silane is recommended. For example, the method of adding a silane containing an amino group, a silane containing a ketoxime group, a silane containing an acetoxy group, or silazane compounds to polyorganosiloxane resins containing a vinyl group, and using peroxides for curing is already known (Japanese Patent Kokai 1973 No. 24295). With this method, molding and laminating processes are easy, and products molded by this method have an extremely good water resistance. However, a high consumption of an expensive silicon-bonded vinyl group resin, generally of 10-20 mole percent vinyl, renders this method commercially disadvantageous. Further, such products are inferior in heat resistance and a higher heat exposure of such products, compared with mica products using an ordinary polyorganosiloxane resin, causes extensive smoking. Another method is adding a mixture of phosphoric acid and organic silicon compounds containing an epoxy group to polyorganosiloxane resin and curing it. (Japanese Patent Kokai 1975 No. 98550). The mixture, however, is not compatible with polyorganosiloxane resin. Also, in many cases the method requires dispersion by adding a large volume of alcohol due to the water content. This may result in mica paper being damaged by water or alcohol during the processing of this mixture into laminated mica paper. Another defect is poor stability during storage due to the increased condensation of polyorganosiloxane resin by the presence of phosphoric acid in this mixture.

The method using alkyl silicate as a binder and an organic acid or inorganic acid to cure is also known (Japanese Patent Kokai 1976-Gazette No. 127106). The mica products obtained with this method are superior in heat resistance, but extremely inferior in their mechanical characteristics.

This invention eliminates these defects in the conventional methods and provides silicone mica products with superior mechanical strength, electrical characteristics, water resistance, and heat resistance. It further provides polyorganosiloxane compositions suitable as mica binder compositions.

SUMMARY OF THE INVENTION

This invention concerns the polyorganosiloxane compositions made up of (A) 100 weight parts of polyorganosiloxane resin, and (B) 0.1-10 weight parts of an acid phosphate ester or a mixture of not less than 2 kinds of acid phosphate ester as expressed in the general formula, $(R^1O)_aP(O)(OH)_{3-a}$ wherein $R^1$ denotes a substituted or non-substituted hydrocarbon group, and a denotes 1 or 2. This invention also concerns silicone mica products manufactured by coating polyorganosiloxane resin compositions composed of (A) 100 weight parts of polyorganosiloxane resin, and (B) 0.1-10 weight parts of an acid phosphate ester or a mixture of not less than 2 kinds of acid phosphate esters as expressed in the general formula $(R^1O)_aP(O)(OH)_{3-a}$ wherein $R^1$ denotes a substituted or non-substituted monovalent hydrocarbon, and a denotes 1 or 2, on mica papers; pasteing these mica papers together and subjecting them to heat treatment; and consolidating them into one piece by curing the above mentioned polyorganosiloxane resin.

DESCRIPTION OF THE PREFERRED EMBODIMENT

Polyorganosiloxane resin of (A) used in this invention is the major component of the composition. There is no restriction placed on such a resin as long as it contains a hydroxyl group and/or alkoxy group bonded to a silicon atom in the 3-dimensional network structure of a polysiloxane molecule when cured by dehydration condensation and/or dealcoholing condensation. As is well known, such polyorganosiloxane resin is obtained by hydrolysis or alcoholysis of an organohalogenosilane or a mixture of not less than 2 kinds of organohalogenosilane. Generally, these reactions take place in the presence of solvents which can dissolve organohalogenosilane and its products. Another method is to form a block copolymer by co-hydrolysis of organotrichlorosilane and linear polyorganosiloxane with a hydroxy group, alkoxy group or halogen atom at the end of the molecule. These polyorganosiloxane resins can be expressed by the average unit formula of $R_b^2Si(OR^3)_cO_{(4-b-c)/2}$, wherein $R^2$ denotes a monovalent group selected from monovalent hydrocarbon groups, $R^3$ denotes a monovalent group selected from hydrogen atom and monovalent hydrocarbon groups, b denotes 1.0-1.5, and c denotes 0.05-0.2. Further, it is advantageous to use a monovalent group selected from a methyl group and a phenyl group as $R^2$ for reasons of heat resistance and the easy accessibility of raw materials. Also, the ranges of 1.0–1.4 for inflexible mica plates and 1.2–1.6 for flexible mica plates are desirable as values of b to obtain appropriate hardness.

The polyorganosiloxane resin of this invention is normally used by dissolving it in hydrocarbon solvents such as toluene, xylene, or petroleum solvents, or in a mixture of these solvents and polar solvents. It can also be used by mixing those with different compositions as long as they dissolve with each other. Further, it can be used by mixing or copolymerizing with organic resins such as, alkyd resin, polyester resin, acrylic resin, or epoxy resin.

The acid phosphate of (B) used in this invention is an important component of this invention as a catalyst for expediting the curing of polyorganosiloxane resin. It also gives water resistance and mechanical strength to silicone mica products. There is no particular restriction placed on $R^1$ in the general formula $(R^1O)_aP(O)(OH)_{3-a}$ as long as it is a substituted or non-substituted monovalent hydrocarbon group. Those with a carbon number of 1–8, however, are desirable in order to cure polyorganosiloxane at 250° C. in less than 1 hour. Specific examples are: $(CH_3O)P(O)(OH)_2$, $(CH_3O)_2P(O)(OH)$, $(C_2H_5O)P(O)(OH)_2$, $(C_2H_5O)_2P(O)(OH)$, $(i-C_3H_7O)P(O)(OH)_2$, $(i-C_3H_7O)_2P(O)(OH)$, $(C_4H_9O)P(O)(OH)_2$, $(C_4H_9O)_2P(O)(OH)$, $(C_4H_9OC_2H_4O)P(O)(OH)_2$, $(ClC_2H_4O)_2P(O)(OH)$, $(ClC_2H_4O)P(O)(OH)_2$, $[CH_2=C(CH_3)COOC_2H_4O]_2P(O)(OH)$, $(C_6H_5O)P(O)(OH)_2$, $(C_6H_5O)_2P(O)(OH)$, $(C_6H_5CH_2O)P(O)(OH)_2$, $(C_6H_5CH_2O)_2P(O)(OH)$, $(C_4H_9OC_2H_4O)_2P(O)(OH)$.

These acid phosphates are compatible with polyorganosiloxane resins and do not require the use of a large quantity of common solvents such as alcohol, as is the case with phosphoric acid, because they dissolve relatively well in good solvents of polyorganosiloxane such as toluene and xylene. On the other hand, tri-ester phosphates, which are not acidic, are compatible with polyorganosiloxane resins but are poor catalysts for the curing of polyorganosiloxane resins. They, therefore, are not included in the components of this invention, but there is no problem in using them with the above acid phosphates. A partial concurrent use of phosphoric acid as well, as long as it poses no problem, is also permissible.

In forming the silicone resin mica composite there is present at least 0.01 parts by weight mica, per 100 parts of the silicone resin but usually there is considerably more mica.

These phosphates are added to polyorganosiloxane resin of (A) in either single form or in a mixture of not less than 2 kinds. The quantity to be added is 0.1–10 weight parts, or preferably 1–4 weight parts to 100 weight parts of polyorganosiloxane resin of (A). This is because less than 0.1 weight parts results in the absence of water resistance and mechanical strength in the silicone mica products obtained, as well as in poor catalytic activity to cure polyorganosiloxane. A quantity of more than 10 weight parts is not only impractical as it excessively accelerates the curing of organosiloxane resin, but also because it impedes heat resistance and electrical characteristics of the resultant silicone mica products.

Organosilicon compounds containing a carbon functional group is a component that can be added at will in this invention, and addition thereof can further improve the water resistance of the silicone mica products of this invention. The specific examples of such an ingredient are: vinyl triethoxy silane, vinyl tris(2-methoxy ethoxy) silane, gamma-amino propyl trimethoxy silane, gamma-amino propyl triethoxy silane, N-beta-(amino ethyl)-gamma-amino propyl trimethoxy silane, N-beta-(amino ethyl)-gamma-amino propyl triethoxysilane, beta-(3,4-epoxy cyclohexyl) ethyl trimethoxy silane, gamma-glycidoxypropyl trimethoxy silane, gamma-methacryloxy propyl trimethoxy silane, and polysiloxane obtained by hydrolysis thereof. As to the quantity to be added, less than 0.5 weight parts to 100 weight parts of polyorganosiloxane resin of (A) gives too little effect, and more than 10 weight parts is impractical due to excessive acceleration of curing time. It is desirable that the value be less than 10 weight parts. This ingredient shall hereafter be referred to as component (C).

(B) component and (C) component used in this invention can be added to the polyorganosiloxane resin separately or as a mixture of (B) and (C) components. The ease with which both of these components are dissolved or dispersed in polyorganosiloxane resin results in easier handling and faster curing of the polyorganosiloxane resin compared advantageously with the method of Japanese Patent Kokai 1975 No. 98550. To 100 parts of the silicone resin (A) there is used from 5 to 2000 parts by weight of organic solvent to form a solution of the resin and the other ingredients as well.

The following procedure is to be followed in the manufacture of the silicone mica products of this invention using the polyorganosiloxane compounds of this invention. The polyorganosiloxane of this invention are diluted with a suitable good solvent such as toluene, xylene or petroleum solvents, and then coated on flake mica or mica paper by such methods as impregnation, spray, or brush-on. After the solvent is evaporated at a relatively low temperature of 25°–100° C. the polyorganosiloxane resin-coated mica sections are stacked in layers and then heated to a temperature of 150°–250° C. and, if necessary, under a pressure of 10–150 kg/cm² for 15 minutes to 2 hours.

It should be noted that there is from 5 to 2000 parts by weight of solvent per 100 parts of the silicone resin. This invention allows for the manufacture of mica products with superior mechanical strength, electrical characteristics, water resistance, and heat resistance with ease and good workability. Owing to the above mentioned superior characteristics, the resultant mica products can be used in electrical parts.

When the mica product obtained by this invention is used at a high temperature of above 500° C., as in a heating plate, the use of polyorganosiloxane resin, the major component of this invention whose value of b is 1, and, most importantly, whose $R^2$ is a methyl group is desirable. In this case smoking is almost nil even when the mica product is heated to a temperature at which a heater glows white.

This invention is further described by the examples below. In the following examples, "parts" all refer to parts by weight. The quantities to be added for acid phosphate, substances for comparison, and carbon functional organosilicone compounds are expressed as weight parts to 100 parts of polyorganosiloxane resin. The determination of mica plate characteristics is done using the methods of JIS K 6911. In the tables, A denotes ordinary state and D denotes a value determined after immersing in water for 1 day at 23° C.

EXAMPLE 1

A toluene solution of polyorganosiloxane resin is obtained by co-hydrolysis of a mixture of 36 parts of methyl trichlorosilane, 16 parts of dimethyl dichlorosilane, 33 parts of phenyl trichlorosilane, 15 parts of diphenyl dichlorosilane in the presence of isopropyl alcohol and toluene. This solution is diluted with the toluene so that the resin constitutes 10% of the diluted solution.

P-6: $(C_4H_9OC_2H_4O)_2P(O)(OH)$
P-7: $[CH_2=C(CH_3)COOC_2H_4O]_2P(O)(OH)$
P-8: Equimolar mixture of $(C_6H_5O)_2P(O)(OH)$ and $(C_6H_5O)P(O)(OH)_2$
P-9: Equimolar mixture of $(C_6H_5CH_2O)_2P(O)(OH)$ and $(C_6H_3CH_2O)P(O)(OH)_2$
Substance for comparison
A-1: $H_3PO_4$
A-2: Iron octoate (6% iron solution)

TABLE 1

| | Experiments | | | | | | |
|---|---|---|---|---|---|---|---|
| | Acid Phosphate or Substance for Comparison | | Bending Strength $Kg/cm^2$ | | Volume Resistivity $\Omega$ cm | | Water Absoprtion |
| Examples | Kind | Adding Quantity Parts | A | D | A | D | % |
| 101 | P-1 | 2.0 | 25.6 | 21.0 | $1.1 \times 10^{14}$ | $2.5 \times 10^{12}$ | 0.05 |
| 102 | P-2 | " | 24.8 | 20.5 | $1.5 \times 10^{14}$ | $1.9 \times 10^{12}$ | 0.07 |
| 103 | P-3 | " | 25.2 | 20.2 | $5.6 \times 10^{13}$ | $1.6 \times 10^{12}$ | 0.11 |
| 104 | P-4 | " | 29.6 | 23.6 | $8.1 \times 10^{13}$ | $1.8 \times 10^{12}$ | 0.10 |
| 105 | P-5 | " | 23.0 | 18.6 | $4.1 \times 10^{13}$ | $1.4 \times 10^{12}$ | 0.04 |
| 106 | P-6 | " | 24.5 | 19.9 | $1.7 \times 10^{14}$ | $5.6 \times 10^{12}$ | 0.04 |
| 107 | P-7 | " | 27.3 | 21.1 | $1.1 \times 10^{14}$ | $2.1 \times 10^{12}$ | 0.09 |
| 108 | P-8 | " | 23.3 | 16.5 | $3.6 \times 10^{13}$ | $7.6 \times 10^{11}$ | 0.13 |
| 109 | P-9 | " | 26.4 | 22.2 | $4.4 \times 10^{13}$ | $9.6 \times 10^{11}$ | 0.11 |
| 110 Comparison | A-1 | 2.0 | 18.2 | 4.5 | $7.7 \times 10^{10}$ | $5.6 \times 10^7$ | 5.6 |
| 111 Comparison | A-2 | " | 15.3 | Immeasurable | $3.1 \times 10^8$ | Immeasurable | 12.3 |

The treating solutions of Examples 101-111 of Table 1 are prepared by employing P-1 to P-9 as acid phosphate, and A-1 (phosphoric acid) and A-2 (iron octoate) as substances for comparison. These solutions are coated on muscovite mica papers with 0.09 mm thickness so that the resin coats 10% of mica paper. After the solvent has evaporated and heat treated at 110° C. for 10 minutes, 6 mica papers stacked in layers are pressed with a heat and pressure at 100 kg/cm² and 180° C. for 1 hour. The mica plate thus obtained are further subjected to after-cure in a hot air dryer at 220° C. for 3 hours to obtain a mica plate with a thickness of 0.5 mm. Table 1 shows the resultant bending strength, volume resistivity and water absorption of the mica plates obtained. The experiment using acid phosphate produced extremely sturdy mica plates with superior bending strength, volume resistivity and water absorption after immersion in water.

Acid phosphate
P-1: Equimolar mixture of $(CH_3O)_2P(O)(OH)$ and $(CH_3O)P(O)(OH)_2$
P-2: Equimolar mixture of $(C_2H_5O)_2P(O)(OH)$ and $(C_2H_5O)P(O)(OH)_2$
P-3: Equimolar mixture of $(i-C_3H_7O)_2P(O)(OH)$ and $(i-C_3H_7O)P(O)(OH)_2$
P-4: $(C_4H_9O)_2P(O)(OH)$
P-5: $C_4H_9OP(O)(OH)_2$

EXAMPLE 2

The treating solutions are prepared as in Experiments 201-215 by employing P-3 and P-7 as acid phosphate, A-2 as a substance for comparison, and S-1 to S-8 as a silane containing carbon functional groups to the diluted solution of polyorganosiloxane used in Example 1. Mica plates are produced using the same procedure as in Example 1. The mica plates obtained are extremely sturdy and have better water resistance than those obtained in Example 1. Table 2 shows the compounding ratio of treating solutions and the characteristics of the mica plates obtained.

Acid phosphate
P-3 to P-7 same as in Example 1.
Substance for comparison
A-2 same as in Example 1.
Carbon functional silane or siloxane
S-1: vinyl triethoxysilane
S-2: vinyl tris(2-methoxy ethoxy) silane
S-3: gamma-metacryloxy propyl trimethoxysilane
S-4: gamma-amino propyl triethoxysilane
S-5: N-beta-(amino ethyl)-gamma-amino propyl trimethoxysilane
S-6: Beta-(3,4-epoxy cyclohexyl)ethyl trimethoxysilane
S-7: gamma-glycid oxypropyl trimethoxy silane
S-8: partial hydrolysis condensate of S-4 obtained by adding 11 parts of water to 100 parts of S-4 and refluxing at 75°-80° C. for 1 hour

TABLE 2

| Examples | Acid phosphate or substance for comparison Kind | Adding Quantity Parts | Carbon functional Silane or Siloxane Kind | Adding Quantity Parts | Bending Strength Kg/cm² A | D | Volume Resistivity Ω cm A | D | Water Absorption % |
|---|---|---|---|---|---|---|---|---|---|
| 201 | P-3 | 2.0 | S-1 | 2.0 | 30.6 | 25.2 | $2.1 \times 10^{15}$ | $1.6 \times 10^{14}$ | 0.03 |
| 202 | " | " | S-2 | " | 31.5 | 26.1 | $2.6 \times 10^{15}$ | $1.5 \times 10^{14}$ | 0.03 |
| 203 | " | " | S-3 | " | 29.9 | 25.1 | $1.0 \times 10^{15}$ | $7.8 \times 10^{13}$ | 0.06 |
| 204 | " | " | S-4 | 1.5 | 32.2 | 28.5 | $1.6 \times 10^{15}$ | $2.2 \times 10^{14}$ | 0.04 |
| 205 | " | " | S-5 | " | 33.0 | 28.6 | $5.5 \times 10^{14}$ | $3.6 \times 10^{13}$ | 0.04 |
| 206 | " | " | S-6 | 2.0 | 29.1 | 24.2 | $2.7 \times 10^{15}$ | $8.1 \times 10^{13}$ | 0.05 |
| 207 | " | " | S-7 | " | 34.1 | 30.0 | $1.6 \times 10^{15}$ | $4.9 \times 10^{13}$ | 0.04 |
| 208 | " | " | S-8 | " | 31.4 | 27.1 | $1.0 \times 10^{15}$ | $6.4 \times 10^{13}$ | 0.07 |
| 209 | P-7 | " | S-2 | " | 30.1 | 24.7 | $2.1 \times 10^{15}$ | $1.6 \times 10^{14}$ | 0.05 |
| 210 | " | " | S-4 | 1.5 | 33.5 | 27.6 | $2.9 \times 10^{15}$ | $1.1 \times 10^{13}$ | 0.03 |
| 211 | " | " | S-6 | 2.0 | 29.6 | 24.6 | $8.7 \times 10^{14}$ | $6.1 \times 10^{12}$ | 0.06 |
| 212 | " | " | S-7 | " | 28.5 | 22.7 | $5.6 \times 10^{14}$ | $1.5 \times 10^{12}$ | 0.10 |
| 213 | " | " | S-8 | " | 32.1 | 28.2 | $3.7 \times 10^{14}$ | $2.6 \times 10^{13}$ | 0.05 |
| 214 Comparison | A-2 | 2.0 | S-2 | 2.0 | 20.5 | 10.4 | $2.6 \times 10^{13}$ | $6.1 \times 10^{7}$ | 2.3 |
| 215 Comparison | " | " | S-4 | 1.5 | 18.1 | 5.3 | $3.9 \times 10^{12}$ | Immeasurable | 6.5 |

EXAMPLE 3

A toluene solution of polyorganosiloxane resin is obtained by hydrolysis of methyl trichlorosilane in the presence of toluene and isopropyl alcohol. To obtain the treating solutions of Experiments 301-310 the same methods as in Example 1 are used, and mica plates are obtained from these solutions using the same method as in Example 1. Table 3 shows amount of the acid phosphate of these experiments and characteristics of mica plates obtained.

Acid phosphate
P-4, P-9 same as Example 1.
Substance for comparison
A-2 same as Example 1.
Carbon functional silane or siloxane
S-1, S-3, S-4, S-7, S-8 same as Example 2.

ple 1. The solution is prepared as follows: Fifty percent xylene solution of polymethyl phenyl siloxane and 50% xylene solution of bisphenol A-type epoxy resin are mixed so the weight ratio of the resin is 1:3. The mixture is subjected to copolymerization by heating during reflux, and the silicone denatured epoxy resin obtained is diluted with toluene so that the resin part constitutes 10% of the solution. Mica plates are formed using the same method as in Example 1 from the solutions 401-406. The heat and pressure molding conditions, are as follows:

Table 4 shows the characteristics of the mica plates obtained.

Acid phosphate
P-1, P-4, P-5, P-7, P-9 is the same as Example 1.
Substance for Comparison
A-1 is the same as Example 1.

TABLE 3

| Experiment Examples | Acid phosphate or substance for comparison Kind | Adding Quantity Parts | Carbon functional Silane or Siloxane Kind | Adding Quantity Parts | Bending Strength Kg/cm² A | D | Volume Resistivity Ω cm A | D | Water Absorption % |
|---|---|---|---|---|---|---|---|---|---|
| 301 | P-4 | 1.2 | S-1 | 1.2 | 28.6 | 23.3 | $2.5 \times 10^{15}$ | $1.6 \times 10^{13}$ | 0.08 |
| 302 | " | " | S-3 | " | 27.7 | 22.1 | $2.0 \times 10^{15}$ | $7.8 \times 10^{12}$ | 0.09 |
| 303 | " | " | S-4 | " | 30.0 | 25.5 | $3.5 \times 10^{15}$ | $1.0 \times 10^{13}$ | 0.09 |
| 304 | " | " | S-7 | " | 33.6 | 26.5 | $1.0 \times 10^{15}$ | $5.5 \times 10^{12}$ | 0.11 |
| 305 | " | " | S-8 | " | 34.1 | 27.1 | $6.1 \times 10^{15}$ | $2.2 \times 10^{14}$ | 0.09 |
| 306 | P-9 | 1.5 | S-4 | 1.0 | 28.1 | 23.5 | $3.6 \times 10^{13}$ | $4.5 \times 10^{11}$ | 0.14 |
| 307 | " | " | S-7 | " | 27.7 | 23.0 | $8.8 \times 10^{14}$ | $1.2 \times 10^{12}$ | 0.13 |
| 308 | " | " | S-8 | " | 31.2 | 25.6 | $1.1 \times 10^{15}$ | $2.6 \times 10^{13}$ | 0.08 |
| 309 Comparison | A-2 | 1.8 | S-4 | 1.2 | 15.2 | 7.2 | $3.1 \times 10^{13}$ | $7.5 \times 10^{8}$ | 5.6 |
| 310 Comparison | " | " | S-7 | " | 18.1 | 7.6 | $4.1 \times 10^{13}$ | $6.1 \times 10^{8}$ | 4.2 |

EXAMPLE 4

The solutions of Experiments 401-406 shown in Table 4 are prepared using the same method as in Exam- Carbon functional silane
S-7 is the same as Example 2.

TABLE 4

| | Acid phosphate or substance for comparison | | Carbon Functional Silane | | Bending Strength Kg/cm² | | Volume Resistivity Ω cm | | Water Absorption |
| | | Adding Quantity | | Adding Quantity | | | | | |
| Example | Kind | Parts | Kind | Parts | A | D | A | D | % |
|---|---|---|---|---|---|---|---|---|---|
| 401 | P-1 | 2.5 | S-7 | 2.0 | 32.2 | 31.1 | $1.5 \times 10^{15}$ | $2.4 \times 10^{14}$ | 0.04 |
| 402 | P-4 | 2.0 | " | " | 30.6 | 29.5 | $1.0 \times 10^{15}$ | $2.2 \times 10^{14}$ | 0.06 |
| 403 | P-5 | 2.5 | " | " | 30.5 | 28.9 | $9.5 \times 10^{14}$ | $1.1 \times 10^{14}$ | 0.03 |
| 404 | P-7 | " | " | " | 31.1 | 29.1 | $7.1 \times 10^{14}$ | $9.1 \times 10^{13}$ | 0.04 |
| 405 | P-9 | " | " | " | 29.8 | 27.5 | $3.5 \times 10^{14}$ | $6.2 \times 10^{13}$ | 0.04 |
| 406 (Comparison) | A-1 | 2.0 | S-7 | 2.0 | 25.6 | 13.2 | $3.0 \times 10^{14}$ | $4.2 \times 10^{8}$ | 1.15 |

EXAMPLE 5

A mica plate with a thickness of 0.35 mm is obtained by using polyorganosiloxane resin of Example 1 to treat phlogopite mica paper with a thickness of 0.07 mm; the papers are stacked in 6 layers and pressed; and subjected to an after-cure of 220° C. for 5 hours. The following additives are employed with the rest of the conditions being the same as in Example 1. Table 5 shows the compounding ratio and characteristics of the mica plates obtained.

Acid phosphate
P-4 is the same as in Example 1.
P-10 is an equimolar mixture of $(C_4HO)_2P(O)(OH)$ and $(C_4H_0O)P(O)(OH)_2$
Substance for comparison
A-2 is the same as Example 1.
Carbon functional silane
S-4 is the same as Example 2.

TABLE 5

| | Acid phosphate or substance for comparison | | Carbon Functional Silane | | Bending Strength Kg/cm² | | Volume Resistivity Ω cm | | Water Absorption |
| | | Adding Quantity | | Adding Quantity | | | | | |
| Examples | Kind | Parts | Kind | Parts | A | D | A | D | % |
|---|---|---|---|---|---|---|---|---|---|
| 501 | P-4 | 2.0 | — | — | 22.5 | 20.4 | $5.8 \times 10^{12}$ | $4.2 \times 10^{11}$ | 0.12 |
| 502 | P-10 | " | — | — | 21.7 | 19.8 | $5.0 \times 10^{12}$ | $2.9 \times 10^{11}$ | 0.10 |
| 503 | " | " | S-4 | 1.5 | 27.2 | 25.5 | $9.0 \times 10^{12}$ | $8.8 \times 10^{11}$ | 0.07 |
| 504 (Comparison) | A-2 | 2.0 | — | — | 14.1 | Immeasurable | $2.2 \times 10^{8}$ | Immeasurable | 10 or over |
| 505 (Comparison) | " | " | S-4 | 1.5 | 16.5 | 4.0 | $5.1 \times 10^{11}$ | Immeasurable | 8.4 |

We claim:
1. A silicone resin-mica composite comprising:
 (A) 100 parts by weight of a polyorganosiloxane resin having an average unit formula of $R_b{}^2Si(OR^3)_cO_{(4-b-c)/2}$ wherein $R^2$ is a monovalent hydrocarbon group $R^3$ is a monovalent group selected from the class consisting of hydrogen and monovalent hydrocarbon radicals, b has a value of 1.0 to 1.5, and c has a value of 0.05 to 0.2, and
 (B) 0.1 to 10 parts by weight of an acid phosphate ester or a mixture of not less than 2 types of acid phosphate ester as expressed in the general formula $(R^1O)_a-P(O)(OH)_{3-a}$ wherein $R^1$ denotes a substituted or non-substituted monovalent hydrocarbon and a is 1 or 2, and
 (C) at least 0.01 parts by weight of mica.
2. The silicone resin-mica composite of claim 1, further comprising:
 (D) less than 10 parts by weight of a monovalent carbon-functional organosilicon compound wherein said organosilicon compound contains a functional group selected from the class consisting of vinyl, amino, methacryloxy, and epoxy groups and mixtures and hydrolysis products thereof.
3. The composite of claim 1 in which R' is a substituted or non-substituted monovalent hydrocarbon radical having 1 to 8 carbons.
4. The composite of claim 1 in which $R^2$ is a monovalent hydrocarbon radical selected from methyl and phenyl radicals.
5. The silicone resin-mica composite of claim 1 wherein there is additionally present an organic solvent.
6. A process for forming a silicone resin-mica composite comprising (i) mixing,
 (A) 100 parts by weight of polyorganosiloxane resin having an average unit formula of $R_b{}^2Si(OR^3)_cO_{(4-b-c)/2}$ wherein $R^2$ is a monovalent hydrocarbon group, $R^3$ is a monovalent group selected from the class consisting of hydrogen and monovalent hydrocarbon radicals, b has a value of 1.0 to 1.5, and c has a value of 0.05 to 0.2, and
 (B) 0.1 to 10 parts by weight of an acid phosphate ester or a mixture of not less than 2 types of acid phosphate ester as expressed in the general formula, $(R^1O)_aP(O)(OH)_{3-a}$ wherein $R^1$ denotes a substituted or non-substituted monovalent hydrocarbon and a is 1 or 2, and
 (C) from 5 to 200 parts by weight of organic solvent;
 (ii) applying the above mixture to a mica substrate, and (iii) evaporating the solvent.
7. The process of claim 6, wherein there is further present in the solution that is applied to the mica less than 10 parts by weight of monovalent carbon functional organosilicon compound wherein said organosilicon compound contains a functional group selected from the class consisting of vinyl, amino, methacryloxy, and epoxy groups and mixtures and hydrolysis products thereof.

8. The process of claim 6 in which $R^1$ is a substituted or non-substituted monovalent hydrocarbon radical having 1 to 8 carbon atoms.

9. The process of claim 6 in which $R^2$ is a monovalent hydrocarbon radical selected from methyl and phenyl radicals.

10. A process for forming a silicone resin-mica laminate which is capable of withstanding high temperatures without smoking comprising (i) preparing a solution comprising;

(A) 100 parts by weight of polyorganosiloxane resin having an average unit formula of $R_b^2Si(OR^3)_cO_{(4-b-c)/2}$ wherein $R^2$ is a monovalent hydrocarbon group, $R^3$ is a monovalent group selected from the class consisting of hydrogen and monovalent hydrocarbon radicals, b has a value of 1.0 to 1.5, and c has a value of 0.05 to 0.2, and (B) 0.1 to 10 parts by weight of an acid phosphate ester or a mixture of not less than 2 types of acid phosphate ester as expressed in the general formula, $(R^1O)_aP(O)(OH)_{3-a}$ wherein $R^1$ denotes a substituted or non-substituted monovalent hydrocarbon and a is 1 or 2, and (C) from 5 to 2000 parts by weight of organic solvent; (ii) applying the above mixture to mica sheets (iii) evaporating the solvent from said solution at a temperature in the range varying from 25° C. to 100° C. to form coated mica sheets; and (iv) stacking the mica sheets one on top of the other and heating the laminate to a temperature in the range of 150° to 250° C. for a sufficient period of time to obtain the desired mica laminate.

11. The process of claim 10 wherein step (iv) is carried out at a pressure of 10 to 150 kilograms per centimeter square for a period of time varying from 15 minutes to 2 hours.

12. The process of claim 10 wherein there is further present in the solution of step (i) an additive of less than 10 parts by weight of a monovalent carbon functional organosilicon compound wherein said organosilicon compound contains a functional group selected from the class consisting of vinyl, amino, methacryloxy, and epoxy groups and mixtures and hydrolysis products thereof.

13. The process of claim 10 wherein $R^1$ is a substituted or non-substituted monovalent hydrocarbon radical having 1 to 8 carbon atoms.

14. The process of claim 10 in which $R^2$ is a monovalent hydrocarbon radical selected from methyl and phenyl radicals.

* * * * *